(12) United States Patent
Hou et al.

(10) Patent No.: US 7,862,071 B2
(45) Date of Patent: Jan. 4, 2011

(54) AUTOMOTIVE INTERIOR TRIM

(76) Inventors: Jianfeng Hou, 399 Liuzhou Rd., Xuhui District, Shanghai (CN) 200233; Yunju Chen, 399 Liuzhou Rd., Xuhui District, Shanghai (CN) 200233; Shaihua Zhou, 399 Liuzhou Rd., Xuhui District, Shanghai (CN) 200233; Haijun Chen, 399 Liuzhou Rd., Xuhui District, Shanghai (CN) 200233

( * ) Notice: Subject to any disclaimer, the term of this patent is extended or adjusted under 35 U.S.C. 154(b) by 2 days.

(21) Appl. No.: 12/191,352

(22) Filed: Aug. 14, 2008

(65) Prior Publication Data

US 2009/0045609 A1 Feb. 19, 2009

(30) Foreign Application Priority Data

Aug. 15, 2007 (CN) .................. 2007 1 0044883

(51) Int. Cl.
*B60R 21/20* (2006.01)
(52) U.S. Cl. .................................. 280/728.3
(58) Field of Classification Search ............. 280/728.2, 280/728.3, 732
See application file for complete search history.

(56) References Cited

U.S. PATENT DOCUMENTS

| 5,096,220 | A | * | 3/1992 | Nakajima | 280/728.3 |
|---|---|---|---|---|---|
| 5,203,586 | A | * | 4/1993 | Niwa et al. | 280/728.3 |
| 5,382,047 | A | * | 1/1995 | Gajewski | 280/728.3 |
| 5,429,784 | A | * | 7/1995 | Iannazzi et al. | 264/126 |
| 5,433,473 | A | * | 7/1995 | Hiramitsu et al. | 280/728.3 |
| 5,527,574 | A | * | 6/1996 | Iannazzi et al. | 428/43 |
| 5,590,901 | A | * | 1/1997 | MacGregor | 280/728.3 |
| 5,961,142 | A | * | 10/1999 | Shiraki et al. | 280/728.3 |
| 6,453,535 | B1 | * | 9/2002 | Nicholas | 29/413 |
| 6,595,543 | B2 | * | 7/2003 | Desprez | 280/728.3 |
| 6,753,057 | B1 | * | 6/2004 | Gardner, Jr. | 428/43 |
| 6,764,633 | B2 | * | 7/2004 | Takahashi et al. | 264/259 |
| 7,178,825 | B2 | * | 2/2007 | Fujii et al. | 280/728.3 |
| 7,188,861 | B2 | * | 3/2007 | Ono | 280/728.3 |
| 7,384,060 | B2 | * | 6/2008 | Bisognin et al. | 280/728.3 |
| 2002/0000711 | A1 | * | 1/2002 | Schmidt et al. | 280/728.3 |
| 2004/0212178 | A1 | * | 10/2004 | Riesinger et al. | 280/730.2 |
| 2005/0215143 | A1 | * | 9/2005 | Hehn et al. | 442/43 |
| 2005/0269804 | A1 | * | 12/2005 | Yamada et al. | 280/728.3 |

\* cited by examiner

*Primary Examiner*—Paul N Dickson
*Assistant Examiner*—Robert A Coker
(74) *Attorney, Agent, or Firm*—Dickinson Wright PLLC

(57) ABSTRACT

An automotive interior trim for improving deployment safety of seamless passenger airbags for instrument panel is disclosed. The interior trim, mounted on an deployment opening of an airbag module of a framework for a instrument panel, includes a framework with an airbag deployment opening for a instrument panel, an airbag cover covering the airbag deployment opening, a foaming interlayer, a surface layer, and a netlike additional layer which is integrally combined with the foaming interlayer after penetrated by a foam material. When the airbag bursts, the airbag cover is opened outwards and the surface layer of the instrument panel is torn, and the foaming interlayer is torn thereupon too. Under the effect of the netlike additional layer, the foam in the foaming interlayer is fixed by the additional layer, thereby avoiding crumb and hard particle production and improving the deployment safety of the airbag greatly.

17 Claims, 5 Drawing Sheets

AUTOMOTIVE INTERIOR TRIM

BACKGROUND OF THE INVENTION

1. Field of the Invention

The present inventions relates to an automotive interior trim, and more especially to an interior trim for improving deployment safety for seamless passenger airbags on instrument panel.

2. Description of the Prior Art

At present, instrument panel generally provides safety airbags disposed on passenger sides thereof, and more and more types of automobiles are disposed seamless safety airbags thereon. Generally, airbag covers and instrument panel are integrally disposed, so the surface layers of the instrument panel are pre-weakened to form nicks therein which are easy to be torn. When the airbags burst, the pressure produced by airbag deployment causes that the nicks in the instrument panel split open and the airbag covers are opened.

Since the accidents or the conditions of the airbag deployment are different, the airbags produce different amounts of effective energy to impact interior trims under different conditions. When the airbags are opened under the effect of high energy, comparing with the effective energy which is needed during opening the airbags, only a little energy can be absorbed via breaking and opening the interior trims, and the excess energy causes material damage of the interior trims, which results in the ejection of crumbs and particles of foam filler between the frameworks and the surface layers of the instrument panel and between the airbag covers and the surface layers. This may also causes that hard components are damaged and passengers are hurt.

SUMMARY OF THE INVENTION

An object of the present invention is to provide an interior trim which can reliably avoid material damage caused by airbag burst, thereby preventing crumbs from appearing and particles from being ejected, and improve deployment safety for seamless passenger airbags for instrument panel.

To achieve the above-mentioned object, an automotive interior trim in accordance with the present invention is disclosed.

The automotive interior trim, adapted for being mounted on a deployment opening of an airbag module of a framework for a instrument panel, includes a framework with an airbag deployment opening for a instrument panel; an airbag cover covering the airbag deployment opening; a foaming interlayer and a surface layer; and a netlike additional layer which is integrally combined with the foaming interlayer after a foam material is penetrated into the netlike additional layer.

When the airbag bursts, the airbag cover is opened outwards and the surface layer of the instrument panel is torn, and the foaming interlayer is torn thereupon too. Under the effect of the netlike additional layer, the foam in the foaming interlayer is fixed by dense meshes, thereby avoiding crumb and hard particle production and improving the deployment safety of the airbag greatly.

The netlike additional layer may be wholly or partially arranged on the airbag cover and an edge region of the airbag deployment opening of the framework for the instrument panel, and the airbag cover has a pre-cut line formed on an edge thereof.

The netlike additional layer is a sheet material with meshes in the surface thereof, which is formed by winding and pressing nylon wires or polyester wires.

BRIEF DESCRIPTION OF THE DRAWINGS

FIG. 6c is cross-sectional view of the mesh additional layer as shown in FIG. 6a.

DETAILED DESCRIPTION OF THE INVENTION

To further understand functions and features of the present invention, please refer to the detailed description of the preferred embodiment related the interior trim for covering an airbag of the present invention according to FIGS. 1-5.

Figure 1:
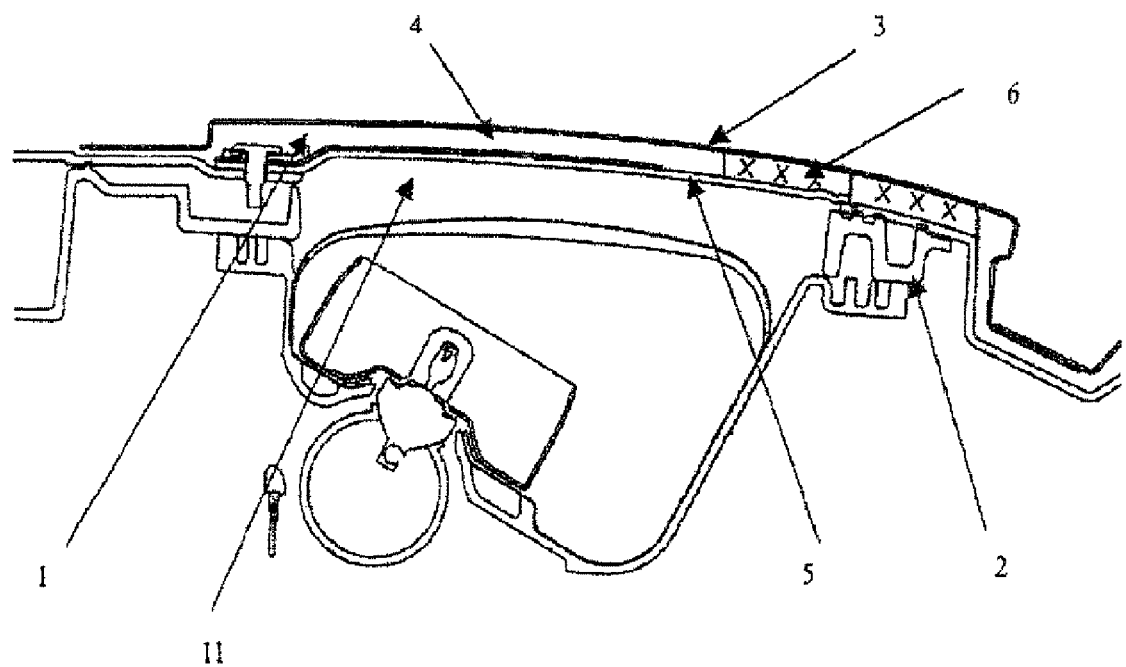
FIG. 1 is a cross-sectional view of an interior trim with a netlike additional layer for covering an airbag of the present invention.
Figure 2:
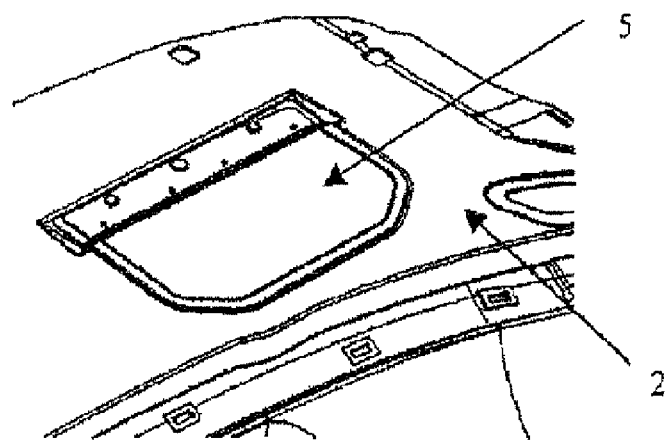
FIG. 2 is a schematic view showing that an airbag cover is mounted on a framework for a instrument panel.

As shown in FIG. 1 and FIG. 2, an automotive interior trim 1 of the present invention is one part of an instrument panel and disposed on an airbag module. The automotive interior trim 1 includes a framework 2 for an airbag deployment opening portion of the instrument panel, a soft-feel surface layer 3, a foaming interlayer 4 and an airbag cover 5 made of a hard material. The airbag module is disposed behind a deployment opening 11 of the framework for the instrument panel and fixed on the edge of the deployment opening 11 of the framework 2 via bolts. When the airbag is a seamless airbag, the surface layer of the airbag cover is integral with that of the instrument panel and has a weakening lines predefined thereon.

The interior trim 1 of the present invention further has a netlike additional layer 6 pre-fixed on the airbag cover 5 and the framework 2. Polyurethane, which composes the foaming interlayer 4, foams and then uniformly permeates into the netlike additional layer, whereby the netlike additional layer 6 becomes one part of the interlayer. The netlike additional layer 6 is chosen to meet the demand that during the foaming of the foaming interlayer, the additional layer 6 doesn't produce deformation such as melting or flowing deformation and can ensure that the foam material permeates into meshes thereof evenly and sufficiently. The foaming interlayer is often made of polyurethane, so the netlike additional layer 6 is preferredly a sheet material, as best shown in FIGS. 6a, 6b, 6c and 7, with dense meshes in the surface thereof, which is formed by winding and pressing nylon wires 13 or polyester wires 13. The meshes are irregularly arranged in the surface of the whole additional layer and have diameters of about 2~8 mm. If the meshes are too big in size, then they cannot fix the foam; and if the meshes are too small in size, then they are unsuitable for the uniform permeation of the foam material. The thickness of the netlike additional layer 6 should be smaller than that of the foaming interlayer, preferredly 2~5 mm. The netlike additional layer 6 may be attached on the airbag cover via double-sided adhesive tapes or glue beforehand and won't produce displacement deformation on the airbag cover.

Figure 6A:
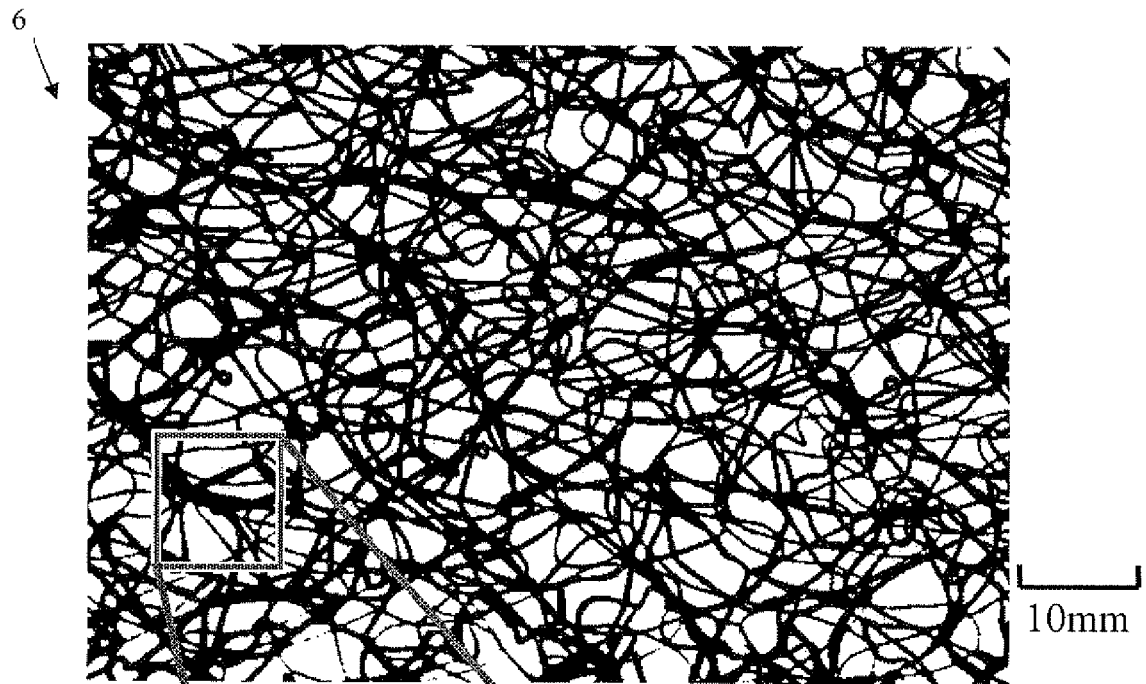
FIG. 6a is an enlarged partial view of the mesh additional layer formed by melting and pressing nylon wires according to the subject invention.
Figure 6B:
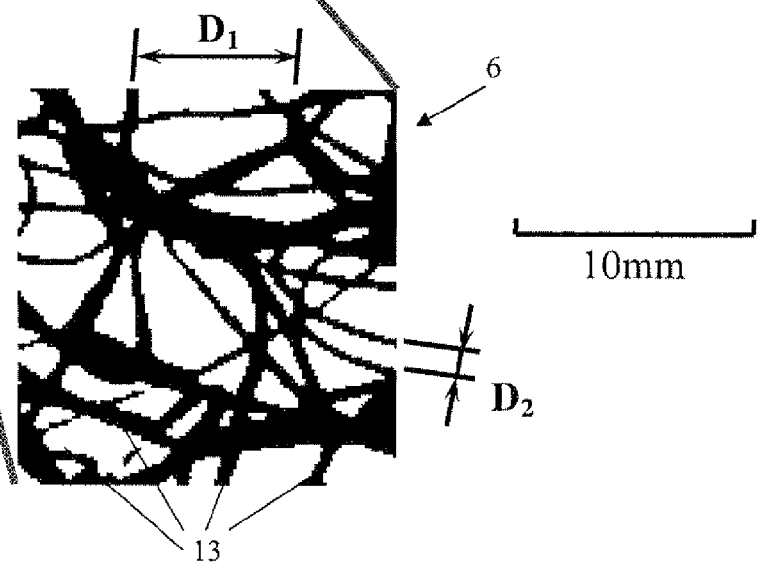
FIG. 6b is enlarged section of the mesh additional layer taken from FIG. 6a showing dimensions according to the subject invention.
Figure 6C:
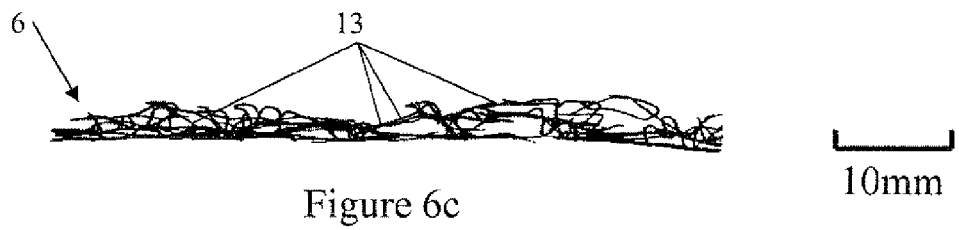
Figure 7:
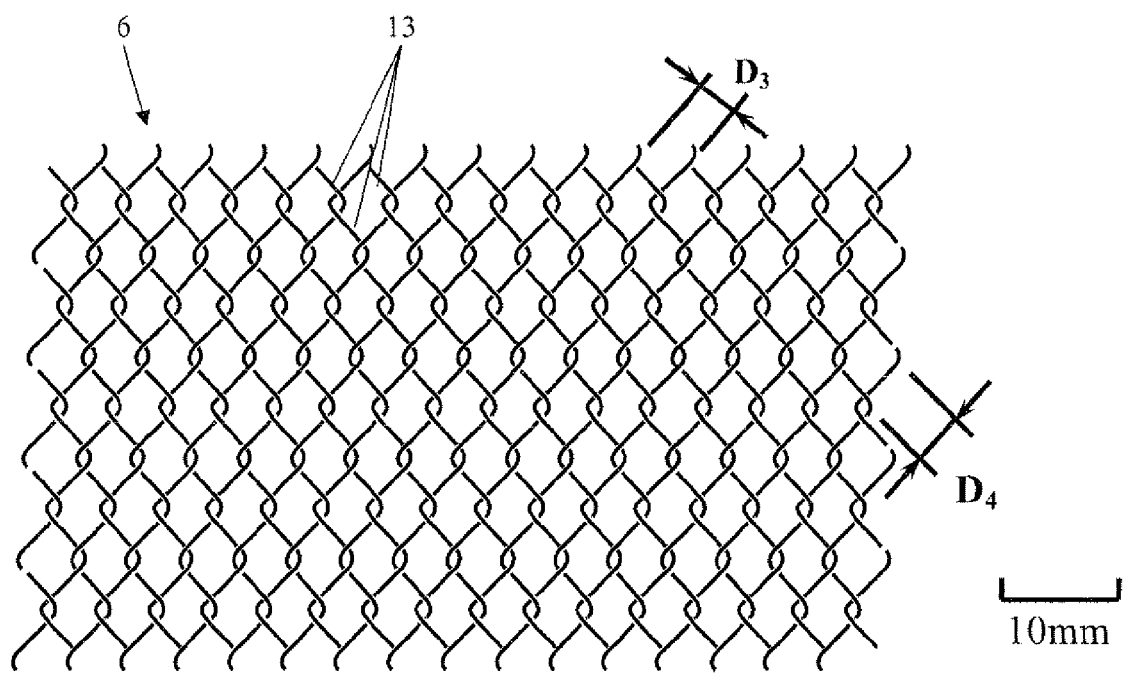
FIG. 7 is an enlarged partial view of the mesh additional layer formed by woven nylon wires according to the subject invention.

FIGS. 6a and 7 are an example of the netlike additional layer 6, produced by melting and pressing nylon or woven wires 13, so that the netlike additional layer can be formed of a certain thickness, as shown in FIG. 6c. The distance or diameter between two opposite strands or wires 13, as marked in FIGS. 6b, by $D_1$ and $D_2$, and 7, by $D_3$ and $D_4$, is normally in the range between 2 mm to 8 mm.

When the airbag bursts, the pressure produced by the deployment of the airbag causes that the airbag cover 5 is opened outwards. The airbag cover 5 must have enough high hardness to ensure that the airbag cover doesn't deform under the pressure of the airbag thereby avoiding hurting passengers. Thus, the material of the airbag cover 5 may be metal or plastic, of which hardness is enough high to ensure that the airbag cover 5 doesn't produce plastic deformation under the impact force produced during the deployment of the airbag and can deploy or split along the direction of a pre-defined tearing line. Also, when turning over to contact with a front windshield, the airbag cover won't break the windshield, thereby avoiding forming fragments or sharp edges and thus hurting passengers.

Figure 3:
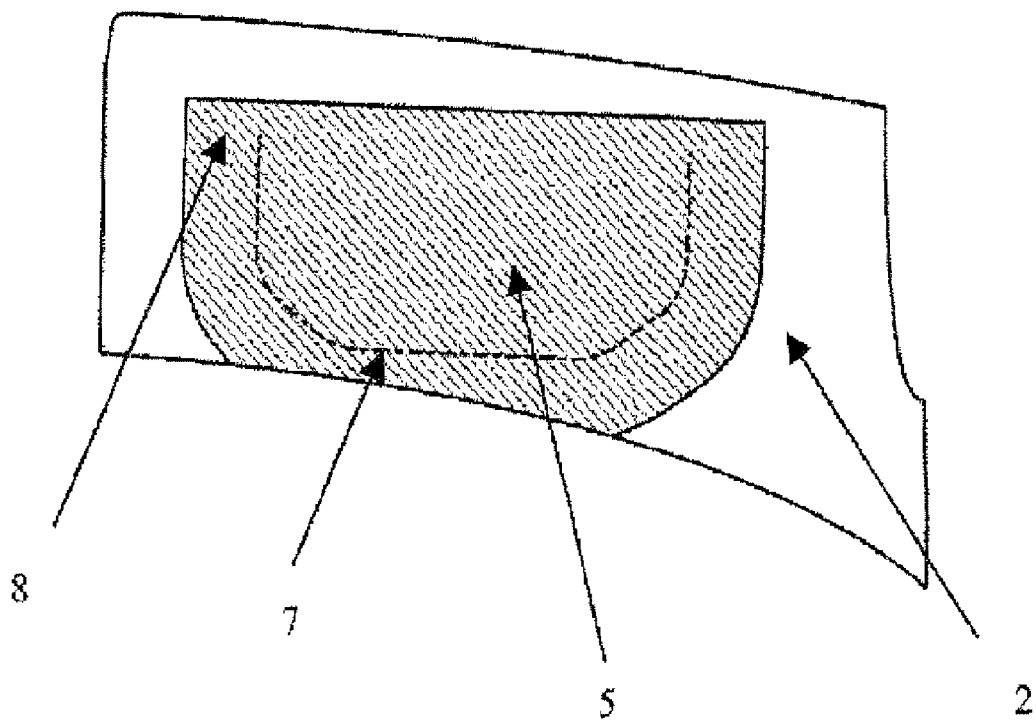
FIG. 3 is a schematic view of one embodiment of complete coverage.

As shown in FIG. 3, the netlike additional layer in the whole piece is arranged on the airbag cover 5 and an edge region 8 of the airbag deployment opening on the framework for the instrument panel. In the embodiment, the netlike additional layer 6 is arranged not only on the whole surface of the airbag cover 5, but also on the edge region 8 where the airbag cover 5 engages with the airbag deployment opening of the framework for the instrument panel. So the netlike additional layer 6 must be pre-cut in order that the airbag cover 5 can be opened successfully when the airbag bursts. To achieve the goal, a pre-cut line 7 is formed on the edge of the airbag cover 5. When the airbag bursts, the pressure produced by the deployment of the airbag causes that the airbag cover 5 is opened outwards, and the surface layer of the framework 2 for the instrument panel at the junction of the framework 2 and the airbag cover 5 is torn and the foaming interlayer 4 is torn thereupon too. Under the effect of the netlike additional layer 6, the foam in the foaming interlayer 4 located on the edge region 8 of the airbag deployment opening of the framework for the instrument panel and located on the airbag cover 5 is fixed in the netlike additional layer by the dense meshes, thereby avoiding crumb and hard particle production and improving the deployment safety of seamless passenger airbags for instrument panel.

Figure 4:
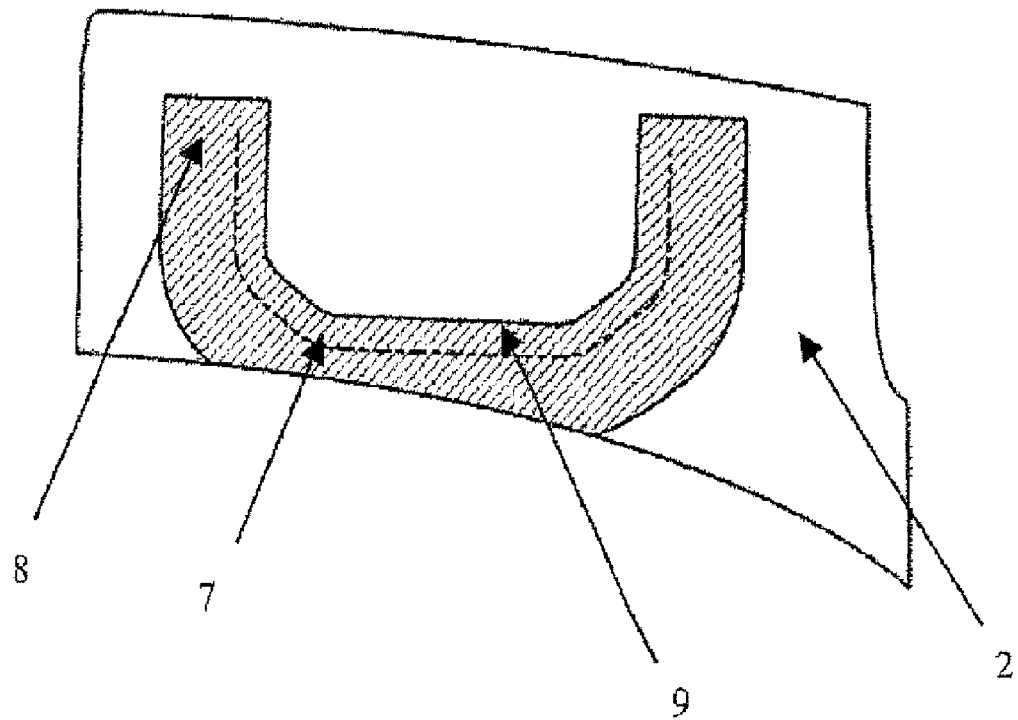
FIG. 4 is a schematic view of one embodiment of partial coverage.

As shown in FIG. 4, the netlike additional layer 6 also may be partially arranged on the airbag cover 5 and the framework 2 for the instrument panel. The netlike additional layer is U-shaped and disposed on the edge region 8 of the airbag deployment opening of the framework for the instrument panel and an edge region 9 of the airbag cover. Similarly, for opening the airbag cover 5 successfully, the edge region of the airbag cover must be pre-cut, so a pre-cut line 7 is formed on the edge region of the airbag cover. That is, in this embodiment, the netlike additional layer 6 may be only disposed on the edge region 9 of the airbag cover 5 and not disposed on the center region of the airbag cover 5. The partial coverage of the netlike additional layer 6 can save the quantity of the netlike additional layer 6 and achieve the same effect.

Figure 5:
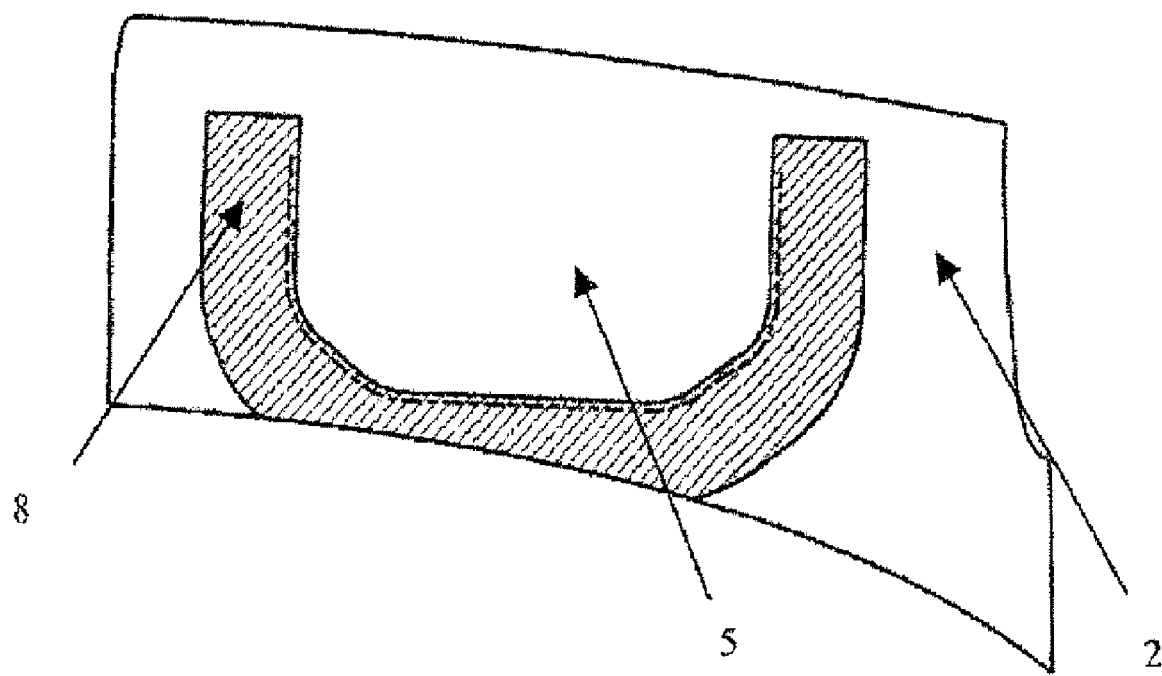
FIG. 5 is a schematic view of another embodiment of partial coverage.

In the embodiment shown in FIG. 5, the netlike additional layer 6 is U-shaped and only disposed on the edge region 8 of the airbag deployment opening of the framework for the instrument panel, not arranged on the region of the airbag cover. The embodiment can only control crumbs from the framework 2 for the instrument panel, however, since the airbag cover mainly produces a pulling force on the framework for the instrument panel connecting with the airbag cover when the airbag cover is opened, the crumbs are easier to appear on the framework for the instrument panel, accordingly, that the netlike additional layer 6 is only disposed on the edge region of the airbag deployment opening of the framework for the instrument panel has no disadvantage on the effects of the present invention. Additionally, the netlike additional layer doesn't need to be pre-cut, so the present invention has features of simplified process and lower cost.

What are disclosed above are only the preferred embodiments of the present invention and it is therefore not intended that the present invention be limited to the particular embodiments disclosed. It will be understood by those skilled in the art that various equivalent changes may be made depending on the claims and the specification of the present invention without departing from the scope of the present invention.

What is claimed is:

1. An automotive interior trim for an instrument panel being mounted on an airbag deployment opening of an airbag module, comprising:
    an instrument panel having a framework defining an airbag deployment opening;
    an airbag cover disposed over said airbag deployment opening and engaging said framework and wherein said airbag cover defines an edge where said airbag cover engages said framework;
    an airbag deployment opening edge region extending outwardly of said edge of said airbag cover and over said framework;
    a surface layer for defining an outer surface of said instrument panel and being spaced from said framework of said instrument panel and said airbag cover to define a gap therebetween;
    a foaming interlayer of a foam material disposed in said gap for filling said gap; and
    a mesh additional layer disposed in said airbag deployment edge region and fixed to said framework in said airbag deployment opening edge region and being a sheet material having a plurality of wires meshed together and arranged to define a space having a diameter between each of adjacent ones of said plurality of wires for permeation of said foam material into said mesh additional layer to integrally combine said mesh additional layer with said foaming interlayer;
    wherein said airbag cover separates from said framework at said edge and said foam interlayer is fixed in said mesh additional layer for avoiding crumb and hard particle production from the foam interlayer when the airbag is deployed and said airbag cover separates from said framework.

2. The automotive interior trim as claimed in claim 1, wherein said mesh additional layer is a single sheet of material comprised of wound and pressed nylon wires.

3. The automotive interior trim as claimed in claim 1 further including an airbag cover edge region extending inwardly of said edge of said airbag cover and over said airbag cover adjacent said edge and wherein said mesh additional layer extends into said airbag cover edge region to integrally combine with said foaming interlayer in said airbag cover edge region.

4. The automotive interior trim as claimed in claim 3, wherein said mesh additional layer is a single sheet of wound and pressed nylon wires.

5. The automotive interior trim as claimed in claim 3, wherein said mesh additional layer is a single sheet of wound and pressed polyester wires.

6. The automotive interior trim as claimed in claim 3 wherein said mesh additional layer is U-shaped.

7. The automotive interior trim as claimed in claim 3 wherein said mesh additional layer is fixed to at least one of said airbag cover and said framework by at least one of a double-sided adhesive tape and a glue.

8. The automotive interior trim as claimed in claim 1, wherein said mesh additional layer is a single sheet of material with wound and pressed polyester wires.

9. The automotive interior trim as claimed in claim 1 wherein the thickness of said mesh additional layer is less than the thickness of said foaming interlayer.

10. The automotive interior trim as claimed in claim 9 wherein the thickness of said mesh additional layer is at least 2 mm.

11. The automotive interior trim as claimed in claim 1 wherein said spaces between each of adjacent ones of said plurality of wires have a diameter between 2-8 mm.

12. The automotive interior trim as claimed in claim 1 wherein said mesh additional layer is fixed to said framework by at least one of a double-sided adhesive tape and a glue.

13. The automotive interior trim as claimed in claim 1 wherein said mesh additional layer is U-shaped.

14. The automotive interior trim as claimed in claim 1 wherein said mesh additional layer extends inwardly from said airbag deployment opening edge region to cover said airbag cover and to integrally combine with said foaming interlayer over said airbag cover.

15. The automotive interior trim as claimed in claim 14 wherein said mesh additional layer is fixed to at least one of said airbag cover and said framework by at least one of a double-sided adhesive tape and a glue.

16. The automotive interior trim as claimed in claim 14, wherein said mesh additional layer is a single sheet of material with wound and pressed nylon wires.

17. The automotive interior trim as claimed in claim 14, wherein said mesh additional layer is a single sheet of material with wound and pressed polyester wires.

* * * * *